US012183503B2

(12) United States Patent
Hofbauer et al.

(10) Patent No.: US 12,183,503 B2
(45) Date of Patent: Dec. 31, 2024

(54) INDUCTIVE COMPONENT

(71) Applicant: SUMIDA COMPONENTS & MODULES GMBH, Obernzell (DE)

(72) Inventors: Johannes Hofbauer, Tittling (DE); Rainer Pilsl, Obernzell (DE)

(73) Assignee: SUMIDA COMPONENTS & MODULES GMBH (DE)

( * ) Notice: Subject to any disclaimer, the term of this patent is extended or adjusted under 35 U.S.C. 154(b) by 581 days.

(21) Appl. No.: 17/614,539

(22) PCT Filed: Jun. 18, 2020

(86) PCT No.: PCT/EP2020/066912
§ 371 (c)(1),
(2) Date: Nov. 28, 2021

(87) PCT Pub. No.: WO2020/254480
PCT Pub. Date: Dec. 24, 2020

(65) Prior Publication Data
US 2022/0223334 A1 Jul. 14, 2022

(30) Foreign Application Priority Data
Jun. 19, 2019 (DE) ..................... 10 2019 208 884.8

(51) Int. Cl.
*H01F 27/32* (2006.01)
*H01F 27/26* (2006.01)
*H01F 27/29* (2006.01)

(52) U.S. Cl.
CPC ......... *H01F 27/324* (2013.01); *H01F 27/266* (2013.01); *H01F 27/292* (2013.01)

(58) Field of Classification Search
CPC ..... H01F 27/324; H01F 27/266; H01F 27/292
See application file for complete search history.

(56) References Cited

U.S. PATENT DOCUMENTS 6,008,712 A 12/1999 Tokuda et al. ................ 336/198
2010/0013588 A1* 1/2010 Sakuma .................... H01F 5/02
336/198

(Continued)

FOREIGN PATENT DOCUMENTS

CN 1965380 A * 5/2007 ............. H01F 27/22
CN 203277061 U 11/2013

(Continued)

OTHER PUBLICATIONS

Office Action dated Dec. 29, 2023 in the counterpart Chinese application No. 202080039942.4. 8 pages and English translation 3 pages.

(Continued)

*Primary Examiner* — Malcolm Barnes
(74) *Attorney, Agent, or Firm* — Fattibene and Fattibene, LLC; Paul A. Fattibene

(57) ABSTRACT

An inductive component comprises a magnetic core, a winding, and a coil body. The coil body comprises a contact element attached to a contact strip of the coil body for electrical connection to the winding, a magnetic core receptacle in which the magnetic core is received in part, and an elongate recess formed in the contact strip and extending only in part below the magnetic core and above the contact element and extending in a longitudinally direction of the contact strip. A cover cap is attached to the contact strip and covers at least in part a side surface of the magnetic core facing the contact element. The cover cap comprises a first wall section covering at least in part the side surface of the magnetic core facing the contact element. A second wall section of the cover cap extending perpendicular to the first side surface of the magnetic core is inserted into the recess formed in the coil body, where the second wall section (Continued)

extends between the magnetic core and the contact element in the coil body.

20 Claims, 2 Drawing Sheets

(56) References Cited

U.S. PATENT DOCUMENTS

| | | | | |
|---|---|---|---|---|
| 2013/0092411 A1* | 4/2013 | Chen | H01F 27/292 174/50 |
| 2014/0091891 A1* | 4/2014 | Metzler | H01F 27/29 336/192 |

FOREIGN PATENT DOCUMENTS

| | | | | |
|---|---|---|---|---|
| CN | 203351365 U | 12/2013 | | |
| CN | 2057230920 | 11/2016 | | |
| CN | 108597808 A | 9/2018 | | |
| DE | 112013005380 | 8/2015 | | |
| DE | 112013005380 T5 * | 8/2015 | | G01R 15/183 |
| JP | H05-041119 U | 6/1993 | | |
| JP | H11-297535 | 10/1999 | | |
| JP | 2005340680 A | 12/2005 | | |
| JP | 2010027747 A | 2/2010 | | |
| JP | 2018-067674 | 4/2018 | | |
| JP | 2018067674 A * | 4/2018 | | |

OTHER PUBLICATIONS

International Search Report having a mailing date of Oct. 5, 2020 in corresponding PCT application No. PCT/EP2020/066912, 3 pages.

Office Action dated Dec. 13, 2022 in the counterpart Japanese application No. 2021-575044, 6 pages.

* cited by examiner

INDUCTIVE COMPONENT

FIELD OF THE INVENTION

The present disclosure relates to an inductive component and in particular to compliance with insulation requirements for very compact inductive components.

BACKGROUND OF THE INVENTION

Inductive components, such as transformers and chokes, are used in a variety of fields of application. One application example for this is electronics in automobiles in which inductive components are used, inter alia, as ignition transformers for gas discharge lamps or filter chokes. Extensive developments pursued in the automotive sector with regard to automotive electronics led to a sharp increase in the number of electronic components, for example, for use in vehicles as instrument clusters that are used to display data in the car, for controlling the engine management system by actuating the ignition system or the injection system, in anti-lock brake and vehicle dynamics control systems, in controlling airbags, in body control units, in driver assistance systems, in car alarm systems, and multimedia devices such as navigation systems, TV turners, etc.

The number of electronic devices in automobiles increasing with this development necessitates, for example, further adjustments to the electronic components with regard to their structural size in order to comply with the installation spaces in the automobile determined by the vehicle structure despite the increasingly extensive and complex electronics in automobiles. In general, there are further requirements for the electronics in automobiles in terms of robustness, temperature range, vibration and shock resistance (caused by vibrations during vehicle operation), etc., whereby the reliability of the electronics is to be ensured over a long period of time in terms of the most varied of conditions and states.

In addition to the application-related conditions in terms of component size, which is geared in particular at a more compact design of electronic components in order to comply with given installation spaces, for example, as a specified maximum mounting area that an electronic component may occupy at most on a carrier, such as a printed circuit board, to which the electronic component is to be attached, generally prescribed safety standards must be adhered to without, in turn, reducing the performance and quality of electronic components. For example, safety specifications for the implementation of uniform minimum safety standards determine insulation requirements that electronic components are to fulfill, such as compliance with specified air gaps and creepage distances and compliance with a specified dielectric strength.

In general, an air gap or clearance is understood to mean the shortest distance between two conductive parts, in particular the shortest possible connection through air, across recesss and gaps and across insulating attachments that are not connected to the substrate over the entire surface and without gaps. The air gap depends inter alia, on the voltages applied, where electronic components are assigned specified overvoltage categories. Overvoltages that enter the electronic component from outside via connections (e.g. terminals of an electronic component) as well as those that are generated in the electronic component itself and occur at the terminals, must be taken into account. It is to be ruled out by predefined air gaps that a voltage breakdown through air arises via the shortest possible connections through air. In this sense, air gaps limit the maximum possible electric fields in air so that no breakdown occurs.

In contrast, the creepage distance represents the shortest connection between two potentials over a surface of an insulating material which is arranged between the two potentials. The creepage distance generally depends on the effective operating voltage of an electronic component and is influenced, among other things, by the degree of contamination and/or the degree of moisture on a surface of an insulating material. For example, the creepage current resistance of an insulating material is determined by the insulation strength of a surface of the insulating material under the influence of moisture and/or contamination and can be understood as indicating the maximum creepage current that can be set under standardized test conditions in a defined test arrangement. The creepage current resistance depends substantially on the water absorption capacity and the behavior of an insulating material under thermal strain.

Furthermore, the insulation distance is understood to mean the thickness of an insulating material so that this variable is important for determining the dielectric strength of an insulating material.

Due to safety standards that place requirements on air gaps, creepage and insulation distances, compulsory conditions exist for an electronic component for sufficient insulation in dependence of the dimensioning in order to avoid voltage breakdowns (e.g. electric arc or spark discharge) and/or creepage currents as a potential safety risk. For example, voltage breakdowns as electric arcs or spark discharges are to be avoided in the context of explosion safety, while leakage currents represent a safety risk for a user in the event of contacting a leakage current source.

Current approaches to the provision of compact inductive components propose to implement safety clearances over extended distances on the coil body or to pot windings. However, this leads to the problems of increased space requirements if extended distances are to be provided, and to problems in reflow applications with potted systems.

SUMMARY OF THE INVENTION

In view of the above explanations, the object on which the disclosure is based is to provide inductive components having a compact design for being mounted in small installation spaces while complying with specified safety standards, in particular without undercutting specified air gaps and/or creepage distances and/or insulation distances.

In a first aspect of the disclosure, an inductive component is provided, comprising a magnetic core, at least one winding, a coil body wound with the at least one winding, and a cover cap formed from electrically insulating material. The coil body comprises at least one contact element attached to a contact strip of the coil body for electrical connection to the at least one winding, a magnetic core receptacle in which the magnetic core is received in part, and an elongate recess formed in the contact strip and extending only in part below the magnetic core received in the magnetic core receptacle and above the at least one contact element along a longitudinal direction of the contact strip. The cover cap is attached to the contact strip and covers at least in part a side surface of the magnetic core facing the at least one contact element with respect to the at least one contact element, wherein the cover cap comprises a first wall section by which the cover cap covers at least in part the side surface of the magnetic core facing the at least one contact element with respect to the at least at least one contact element, and comprises a second wall section which extends to the first side surface of the magnetic core and which is inserted into the recess formed in the coil body. The second wall section therefore extends between the magnetic core and the at least one contact element in the longitudinal direction only in part along the contact strip. The longitudinal direction of the contact strip is to be understood to be a direction in which the contact strip has a greatest dimension. An “elongate recess” is also to be understood to be a recess, for example, a groove or an elongate notch, which has a direction of extension transverse to a depth direction (i.e. a direction along a depth of the recess into the material into which the recess is formed as a recess), wherein the direction of extension is a direction along which the recess has a greatest dimension. Since the recess extends only in part along the longitudinal direction of the contact strip, the recess has only one opening which is formed only in one side surface of the contact strip. If a plurality of contact elements is provided on the contact strip, a longitudinal direction of the contact strip can additionally or alternatively be understood to be a direction along which the plurality of contact elements is arranged along the contact strip.

Due to the elongate recess in the contact strip, the coil body on the contact strip is configured as a counterpart to the cover cap and a very reliable connection is obtained between the cover cap and the coil body. Due to the cover cap, it is possible to comply with existing requirements for air gaps and creepage distances regardless of the dimensions of the inductive component, so that safety standards in this regard are adhered to even with compact components having small dimensions.

In the various embodiments of the first aspect of the disclosure, the coil body on the contact strip is formed in part as a negative shape of the cover cap, which represents a simple way in which the coil body and the cover cap are matched to one another. More precisely, the coil body on the contact strip is configured in part as a negative shape of at least one wall section of the cover cap, so that the coil body and the cover cap are matched to one another in a simple manner to enable a positive-fit connection. In particular, the positive-fit connection between the cover cap and the coil body is ensured in that the recess in the contact strip is configured as a negative shape with regard to the second wall section.

In a second embodiment of the first aspect of the disclosure, the cover cap can furthermore comprise a third wall section and a fourth wall section which are oriented perpendicular to the first wall section and the second wall section. The third wall section and the fourth wall section extend parallel to one another and each along an edge of the first wall section. In this embodiment, the third and fourth wall sections further increase the insulation and creepage distances between the magnetic core and the at least one additional contact element.

In an illustrative configuration of this second embodiment, the recess in the coil body can be formed from three groove-shaped recess sections, each of which is configured to receive in part the second to fourth wall sections. This shape of the recess allows for a very reliable plug connection between the cover cap and the coil body.

In a third embodiment of the first aspect of the disclosure, the first wall section of the cover cap can comprise at least one web section which extends along a direction that is perpendicular to the side surface of the magnetic core towards the magnetic core and away from the first wall section. For example, the at least one web section can be in physical contact with the magnetic core, where a position of the magnetic core in the coil body is determined by the cover cap and any displacement of the magnetic core in the coil body is prevented when the cover cap has been inserted. In addition, the at least one web section allows for a distance to be maintained between the side surface facing the contact element and the first wall section, in particular that the magnetic core does not slide back in the coil body in the direction of the first wall section of the cover cap. A desired position of the core in the coil body is thereby defined in a simple manner by cover cap by way of the at least one web section. In addition, in the side of the first wall section of the cover cap facing the magnetic core, the at least one web section provides a labyrinth structure which allows for an extension of air gaps and creepage distances according to a length of the at least one web section in the direction perpendicular to the side surface of the magnetic core.

In an exemplary configuration of this third embodiment, the at least one web section can be spaced from the second wall section by an air gap. The cover cap can then be inserted into the recess until the first wall section abuts against the contact strip.

In a second aspect of the disclosure, an inductive component is provided, comprising a magnetic core, at least one winding, a coil body wound with the at least one winding. Herein, the coil body comprises at least one contact element attached to a contact strip of the coil body for electrical connection to the at least one winding and a magnetic core receptacle in which the magnetic core is received in part. The inductive component further comprises a cover cap formed from electrically insulating material which covers at least in part a side surface of the magnetic core facing the at least one contact element by a first wall section of the cover cap with respect to the at least one contact element, wherein the first wall section of the cover cap comprises at least one web section which extends along a direction perpendicular to the side surface of the magnetic core toward the magnetic core and away from the first wall section. Herein, the at least one web section is in physical contact with the magnetic core, so that a position of the magnetic core in the coil body is defined by the cover cap. This prevents the magnetic core from being displaced in the coil body when the cover cap has been inserted. Due to the cover cap, it is furthermore possible to comply with requirements for air gaps and creepage distances regardless of the dimensions of the inductive component, so that safety standards in this regard are adhered to even with compact components having small dimensions. In addition, the at least one web section allows for a distance to be maintained between the side surface facing the contact element and the first wall section, in particular that the magnetic core does not slide back in the coil body in the direction of the first wall section of the cover cap. The cover cap allows for a desired position of the core in the coil body to be defined in a simple manner by way of the at least one web section. In addition, in the side of the first wall section of the cover cap facing the magnetic core, the at least one web section provides a labyrinth structure which allows for an extension of air gaps and creepage distances according to a length of the at least one web section in the direction perpendicular to the side surface of the magnetic core.

In an advantageous first embodiment of the second aspect, the coil body can comprise an elongate recess formed in the contact strip and extending below the magnetic core received in the magnetic core receptacle and above the at least one contact element and extending in a longitudinal direction of the contact strip only in part along the contact strip, wherein a second wall section of the cover cap extending perpendicular to the side surface of the magnetic core is inserted into the recess. Herein, the longitudinal direction of the contact strip is to be understood to be a direction in which the contact strip has a greatest dimension. An "elongate recess" is here as well to be understood to be a recess, for example, a groove or an elongate notch, which has a direction of extension transverse to a depth direction (i.e. a direction along a depth of the recess into the material into which the recess is formed as a recess), wherein the direction of extension is a direction along which the recess has a greatest dimension. Since the recess extends only in part along the longitudinal direction of the contact strip, the recess has only one opening which is only formed in one side surface of the contact strip. If a plurality of contact elements is provided on the contact strip, a longitudinal direction of the contact strip can additionally or alternatively be understood to be a direction along which the plurality of contact elements is arranged along the contact strip.

It is ensured by the first embodiment that the cover cap encloses the magnetic core by way of the first and the second wall sections on the side with the at least one contact element, so that advantageous sealing off or insulating of conductive parts is herein achieved without increasing the dimensions of the coil body for increasing the safety distances between the at least one contact element and the magnetic core. Furthermore, mechanically reproducible positioning of the cover cap on the coil body is achieved due to the recess which, for example, allows for an advantage for mechanical assembly of wound and core-equipped coil bodies with cover caps. Due to the fact that the recess extends only in part along the longitudinal direction of the contact strip, in particular does not completely penetrated the contact strip and is open on more than one side, the cover cap can be reliably attached to the coil body by way of the second wall section by the recess. A positive-fit connection between the cover cap and the coil body is ensured in that the recess in the contact strip is configured as a negative shape with respect to the second wall section.

In an advantageous configuration of the third embodiment of the second aspect of the disclosure, the at least one web section can be spaced from the second wall section by an air gap. It can thereby be ensured that the magnetic core is adequately insulated by the cover cap on a side facing the side with the at least one contact element and that the cover cap can be inserted sufficiently deep into the coil body independently of the web sections.

In a further advantageous configuration of the first embodiment of the second aspect of the disclosure, the cover cap can furthermore comprise a third wall section and a fourth wall section which are oriented perpendicular to the first wall section and the second wall section. The third wall section and the fourth wall section can furthermore extend parallel to the at least one web section and each along an edge of the first wall section. As a result, the cover cap advantageously seals off the winding and the magnetic core with respect to the at least one contact element on the coil body. Herein, the cover cap can be provided as a pot-shaped or bowl-shaped insulation body which enables mechanically stable covering of the core received in the coil body from the at least one contact element. According to an illustrative example, the recess can be formed from three groove-shaped recess sections, each of which is configured to receive in part the second to fourth wall sections. As a result, three wall sections of the cover cap can advantageously be received in part by the recess, which can enable the magnetic core to be reliably sealed off from the at least one contact element. As a result, compliance with safety standards with regard to the winding can also be ensured.

In an advantageous second embodiment of the second aspect of the disclosure and according to an advantageous configuration of the third embodiment of the first aspect, more than one web section can be formed as a plurality of web sections on the first wall section. The plurality of web sections projects from the first wall section towards the magnetic core, where at least one of the plurality of web sections is in physical contact with the magnetic core. This provides a labyrinth structure on the side of the first wall section of the cover cap facing the magnetic core, so that further extension of air gaps and creepage distances is provided.

In an advantageous third embodiment of the second aspect of the disclosure and according to an advantageous configuration of the third embodiment of the first aspect, the cover cap can be pushed onto the coil body such that the magnetic core is surrounded at least in part by the cover cap on at least three side surfaces. Herein, the cover cap can be provided as a pot-shaped or bowl-shaped insulation body which enables mechanically stable covering of the core received in the coil body from the at least one contact element.

In an advantageous configuration of the third embodiment of the second aspect and according to an advantageous configuration of the first aspect of the disclosure, the at least one contact element on the coil body can be configured as a gull wing contact pin. This allows for a structural configuration of the contact element and the cover cap, which allows for the implementation of the inductive component in a SMD (surface mounted device) construction as an SMD component. The cover cap in these constructions ensures compliance with safety standards. Alternatively, the at least one contact element can be configured as a contact pin for a THT (through hole technology) construction, so that the inductive component is provided for through-hole mounting as a THT component. Through-hole mounting in THT (also referred to as "pin-in-hole" or PIH technology) is understood to mean mounting wired electronic components in assembly and connection technology in which, in contrast to the surface mounting, components have wire connections and are formed as "wired components" which are inserted through contact holes in the printed circuit board during assembly and then connected to one or more conductor tracks by soldering (conventional hand soldering, wave soldering, selective soldering, etc.). In SMD mounting, on the other hand, no wire connections are provided, but SMD components are soldered directly onto a printed circuit board as flat components using solderable connection surfaces.

In an advantageous fourth embodiment of the second aspect of the disclosure and according to an advantageous configuration of the first aspect, the at least one contact element can be arranged on a high-voltage side of the coil body. This ensures that safety standards are complied with at the high-voltage side of inductive components.

In an advantageous configuration of the fourth embodiment of the second aspect of the disclosure and according to an advantageous configuration of the third embodiment of the first aspect, the at least one contact element can be arranged on a high-voltage side of the coil body. This ensures sufficient safety distances on the high-voltage side of the coil body.

In an advantageous configuration of the first and the second aspect of the disclosure, the coil body can be configured for SMD population of a printed circuit board and the inductive component is provided as an SMD component. For example, compact chopper transformers can then be implemented. Alternatively, the coil body can be configured for THD population of a printed circuit board and the inductive component is provided as a THD component. Corresponding components can be provided having small dimensions in compliance with the required air gaps and creepage distances.

In the context of the disclosure, a cover cap ensures sufficient air gaps and creepage distances in a safe and reliable manner, regardless of the dimensions of the inductive component, without, for example, requiring potting. Herein, the cover cap is merely attached to a point on the coil body where an improvement in creepage and insulation distances is required. It is also possible to easily retrofit existing components with cover caps or to replace existing cover caps, for example, in the course of maintenance work, etc. Inductive components, as described above and hereafter with regard to various embodiments, allow for simple mounting and removal of the cover cap, where the cap is attached only to a contact strip of the coil body. As a result, the disclosure can advantageously be applied to SMT and THT without the design of a coil body having to be heavily modified.

In embodiments, the side surface section of the magnetic core that is facing the contact elements is covered at least in part by a wall section of the cover cap whereby leakage currents can be suppressed very efficiently. The cover cap allows for an insulation body to be provided separately in addition to the coil body, which enables the inductive component to be modularized and the air gaps and creepage distances to be adapted in a retrofitted manner. The cover cap and the coil body can be coupled in a mechanically detachable manner, as a result of which creepage distance extensions in an inductive component can be obtained in a simple manner and, if necessary, individual components can be exchanged and retrofitted. An extension of the air gap and creepage distance can be specified by way of the number of web sections and their geometric configuration, where a labyrinth structure is implemented on a wall section of the cover cap that faces the magnetic core. In addition, the web sections serve as spacers which prevent the magnetic core from slipping back in the direction of the at least one contact element and, based on this advantageous measure, also set a position of the core on the coil body. Furthermore, the cover cap is easy to manufacture using, for example, injection-molding techniques and can be produced inexpensively in large numbers.

For example, in at least some of the embodiments described herein, it is advantageous to have a reliable attachment of cover cap 20 be made possible by inserting the cover cap into the recess in the coil body, substantially perpendicular to the side surface of the contact strip in which the recess is formed, so that the cover cap can be attached to the coil body in a reliable and reproducible manner relative to the magnetic core. This attachment can be detachable, in that the cover cap is merely inserted, or can also be a permanent attachment of the cover cap to the coil body by way of adhesive or the like. Herein, it is also advantageous that the cover cap can be attached to only a contact strip of the coil body, so that the cover cap can be arranged in a space-saving and compact form only on the contact strip or the at least one contact element for which an increase in creepage and insulation distances is desired, such as a contact element to which a high voltage is applied during operation, or on a high-voltage side of the coil body.

BRIEF DESCRIPTION OF THE DRAWINGS

Further advantages and features of the disclosure shall be described in more detail below in the context of the accompanying figures, where.

DETAILED DESCRIPTION OF THE PREFERRED EMBODIMENTS

Figure 1A:
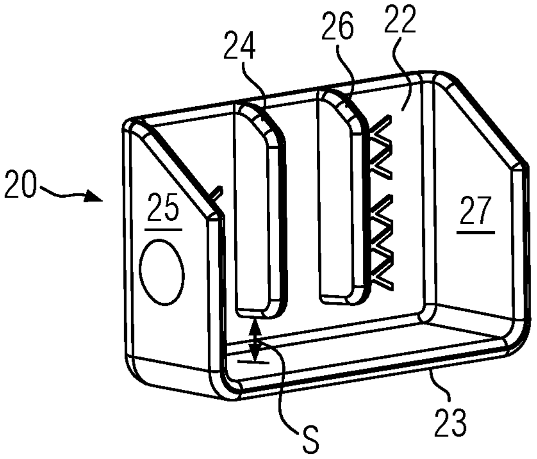
FIG. 1*a* schematically shows a cover cap for an inductive component according to embodiments of the disclosure in a perspective view.
Figure 1B:
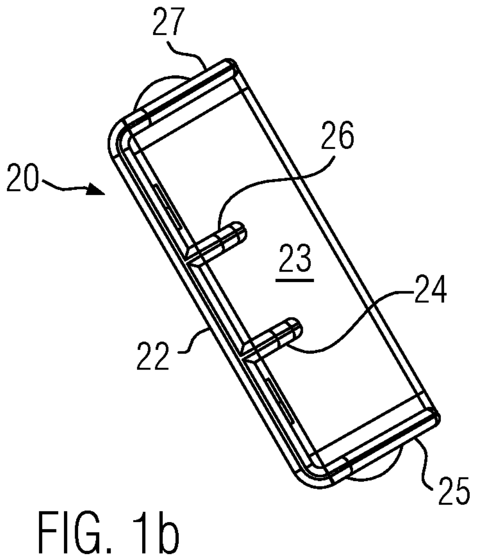
FIG. 1*b* shows the cover cap from FIG. 1*a* schematically in a top view, FIG. 2*a* schematically shows a coil body for an inductive component according to embodiments of the disclosure in a perspective side view, FIG. 2*b* schematically shows the coil body from FIG. 2*a* in a side view rotated relative to FIG. 2*a,*

A cover cap 20 for an inductive component is described hereafter with reference to FIGS. 1*a* and 1*b* according to some illustrative embodiments of the disclosure in correspondence to the above first and second aspects of the disclosure. Cover cap 20 is formed from electrically insulating material. For example, cover cap 20 can be produced using injection-molding processes.

Cover cap 20 can be provided, for example, as a pot-shaped or bowl-shaped insulation body, where cover cap 20 is formed by a first wall section 22, a second wall section 23, a third wall section 25, and a fourth wall section 27 which are each connected to one another along edges, so that cover cap 20 geometrically represents, for example, a cuboid body with two adjacent open sides. Second to fourth wall sections 23, 25, 27 of cover cap 20 are mechanically connected to first wall section 22 along three side edges of first wall section 22 and extend along a direction of the surface normal of first wall section 22 away from first wall section 22. Second wall section 23 is respectively oriented perpendicular to first wall section 22, third wall section 25, and fourth wall section 27. Third wall section 25 and fourth wall section 27 are oriented parallel to one another. As a result, a volume above first wall section 22 is laterally surrounded on three sides by second to fourth wall sections 23, 25, 27.

As shown in FIGS. 1*a* and 1*b*, cover cap 20 comprises two web sections 24, 26 which are formed on first wall section 22 and extend along a direction of the surface normal of first wall section 22 away from first wall section 22. Web sections 24, 26 are oriented parallel to one another, parallel to third and fourth wall sections 25, 27, and perpendicular to first and second wall sections 22, 23.

According to the illustration in FIG. 1*a*, web sections 24, 26 can be spaced from second wall section 22 by an air gap S. In other words, web sections 24, 26 can be mechanically connected only to first wall section 22. Furthermore, a length of web sections 24, 26 along a direction in which web sections 24, 26 project from the first wall section can be less than or equal to a length of second to fourth wall sections 23, 25, 27 along this direction. If second to fourth wall sections 23, 25, 27 have unequal lengths along this direction, a length of the web sections along this direction can be less than or equal to a greatest of the lengths of second to fourth wall sections 23, 25, 27 along this direction.

A coil body 30 for an inductive component shall now be described with reference to FIGS. 2*a* to 2*c* according to some illustrative embodiments in correspondence to the first and second aspects of the disclosure.

Figure 2A:
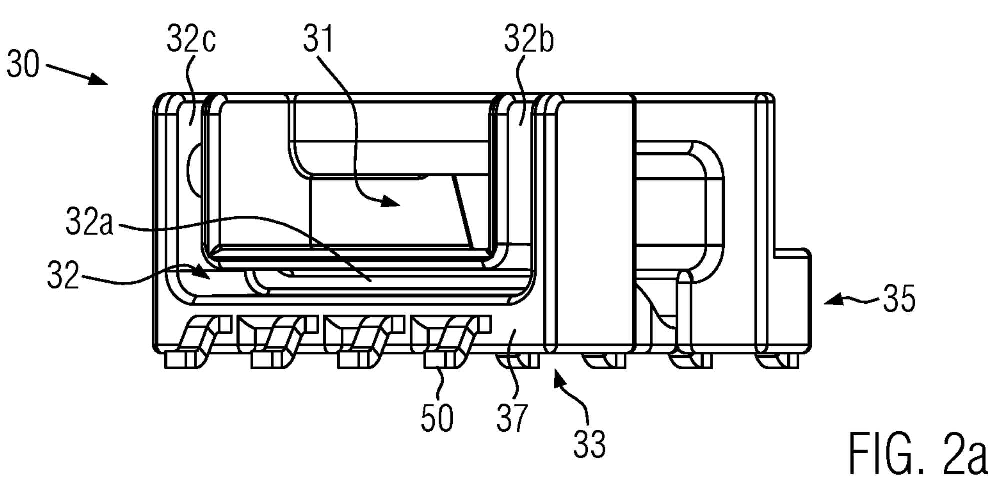
FIG. 2*c* schematically shows the coil body from FIG. 2*a* in a view from below, and FIG. 3 schematically shows an inductive component according to embodiments of the disclosure in a view from above onto the component.
Figure 2B:
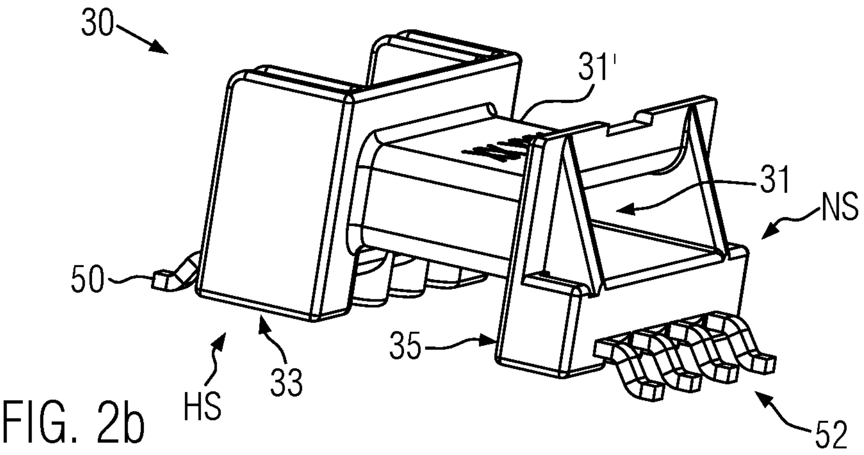
Figure 2C:
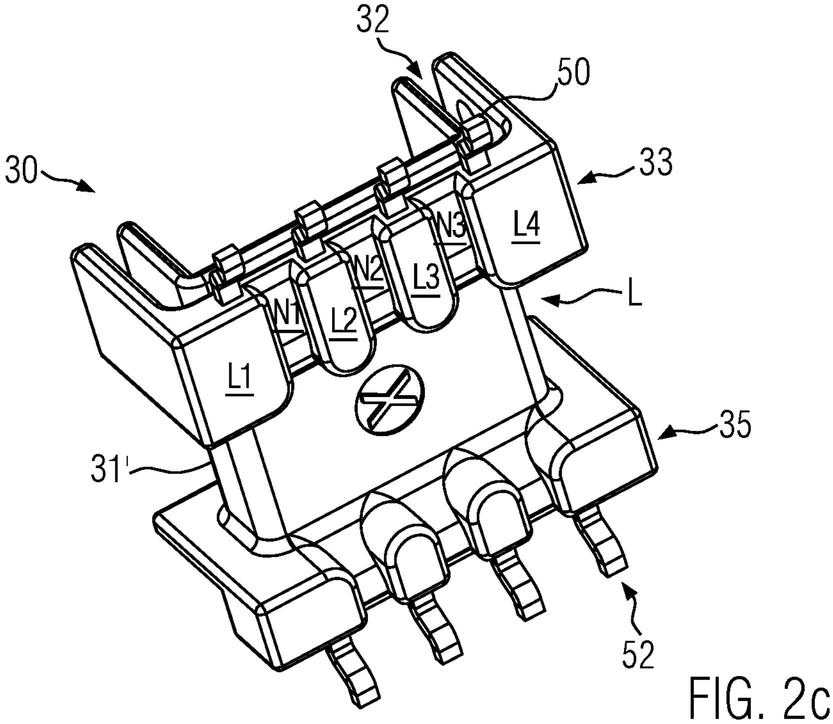

According to the illustration in FIGS. 2*a* to 2*c*, coil body 20 30 comprises two contact strips 33, 35 which are connected to one another by a connecting section 31'. Contact strips 33, 35 are formed at opposite ends of connecting section 31' which can have, for example, a hollow cylindrical shape. Contact strips 33, 35 are elongate elements of coil body 30, which means that they each have a longitudinal direction in which contact strips 33, 35 each have a greatest dimension.

In some illustrative examples, connecting section 31' can comprise two openings at oppositely disposed ends of connecting section 31', where contact strips 33, 35 are each arranged at one of these ends. As a result, a magnetic core receptacle 31 is provided by which a magnetic core (not shown in FIGS. 2*a* to 2*c*) can be received in part by coil body 30. For example, a leg of a magnetic core (not shown in FIGS. 2*a* to 2*c*) can be received in part in magnetic core receptacle 31 of coil body 30.

With reference to FIG. 2*b*, contact strip 33 is arranged on a high-voltage side HS of coil body 30 and contact strip 35 is arranged on a low-voltage side NS of the coil body. Furthermore, coil body 30 comprises at least one contact element 50 attached to contact strip 33 on side HS of coil body 30 for electrical connection to at least one winding (not shown in FIGS. 2*a* to 2*c*). At least one further contact element 52 for electrical connection to at least one winding (not shown in FIGS. 2*a* to 2*c*) can also be provided on contact strip 35 on side NS of coil body 30. Additionally or alternatively, "the longitudinal direction" of contact strip 33, also with regard to contact elements on contact strip 33, can be defined as follows. If, for example, a plurality of contact elements 50 is provided on the contact strip, a longitudinal direction of contact strip 33 can be defined as a direction along which the plurality of contact elements 50 is arranged along contact strip 33.

According to some illustrative embodiments, side NS of coil body 30 can represent a low-voltage side of an inductive component (not shown in FIGS. 2*a* to 2*c*) and side HS of coil body 30 can represent a high-voltage side. A distinction between the low-voltage side on side NS of coil body 30 and the high-voltage side on side HS of coil body 30 can be made in that contact strip 33 on side HS of coil body 30 has a greater width relative to contact strip 35 on side NS of the coil body (i.e., a dimension of contact strip 33 in a direction along which a magnetic core (not shown in FIGS. 2*a* to 2*c*) is received in magnetic core receptacle 31 of coil body 30, when coil body 30 is fitted with a magnetic core, is greater in comparison to contact strip 35).

In exemplary embodiments of the disclosure, coil body 30 is formed on contact strip 33 of coil body 30 as a counterpart to cover cap 20. For example, as shown in FIGS. 2*a* and 2*c*, coil body 30 has an elongate recess 32 on side HS. The elongate recess 32 can represent a groove-shaped recess which is formed in contact strip 33 in such a way that it extends in the longitudinal direction only in part along contact strip 33 and in contact strip 33 runs above at least one contact element 50. An "elongate recess" is presently to be understood to be a recess, for example, a groove or an elongate notch, which has a direction of extension transverse to a depth direction (i.e. a direction along a depth of the recess into the material of contact strip 33 in which recess 32 is formed as a recess), where the direction of extension is a direction along which recess 32 has a greatest dimension. Since recess 32 extends in the longitudinal direction only in part along contact strip 33, recess 32 has only one opening in the longitudinal direction which is formed only in one side surface of contact strip 33 in which at least one contact element 50 on coil body 30 is exposed.

In embodiments of the disclosure, recess 32 is configured in such a way that a cover cap, for example, cover cap 20 shown in FIGS. 1*a* and 1*b*, can be received in part therein so that a positive-fit connection is established between the cover cap and the coil body. In this case, recess 32 can represent a negative shape of a section of cover cap 20 so that coil body 30 on contact strip 33 is formed in part as a negative shape of cover cap 20. For example, second wall section 23 of cover cap 20 shown in FIGS. 1*a* and 1*b* can be inserted into recess 32 so that second wall section 23 is received in part in recess 32, where contact strip 33 is formed in part as a negative shape of second wall section 23 of cover cap 20. For this purpose, recess 32 can be configured as a longitudinal groove, for example, merely in the form of a longitudinal groove 32*a* which is shown in FIG. 2*a*. Longitudinal groove 32*a* can run parallel to the longitudinal direction of contact strip 33 above at least one contact element 50, where the longitudinal direction of contact strip 33 represents a longest geometric dimension of contact strip 33, as described above. Longitudinal groove 32*a* extends in the longitudinal direction of contact strip 33 only in part along contact strip 33. There are no openings in longitudinal groove 32*a* at the ends of contact strip 33 along the longitudinal direction of contact strip 33. This allows cover cap 20 to be reliably attached by inserting cover cap 20 into the longitudinal groove 32*a*, directed substantially perpendicular to side surface 14, so that cover cap 20 can be attached to coil body 30 relative to magnetic core 10 in a reliable and reproducible manner. This attachment can be detachable, in that cover cap 20 is merely inserted, or can furthermore be a permanent attachment of cover cap 20 to coil body 30 by way of adhesive or the like. It is there also advantageous that cover cap 20 can only be attached to a contact strip of coil body 30, so that cover cap 20 can be arranged in a space-saving and compact form only on contact strip 33 or on at least one contact element 50 for which an increase in creepage and insulation distances is desired, such as a contact element 50 to which a high voltage is applied during operation, or on a high-voltage side of coil body 30.

A special illustrative configuration of recess 32 is described with reference to FIG. 2*a* in conjunction with FIG. 1*a* according to which recess 32 is formed from three groove-shaped recess sections 32*a*, 32*b*, 32*c*, each of which is formed to receive in part second to fourth wall sections 23, 25, 27 of cover cap 20 shown in FIG. 1*a*, where contact strip 33 formed in part as a negative shape of second to fourth wall sections 23, 25, 27 of cover cap 20. For example, each of three groove-shaped recess sections 32*a*, 32*b*, 32*c* is formed as a longitudinal groove which are connected to one another and realize a single end-to-end recess in correspondence to recess 32 shown in FIG. 2*a*. Herein, groove-shaped recess sections 32*b* and 32*c* are oriented perpendicular to groove-shaped recess section 32*a*, and groove-shaped recess sections 32*b* and 32*c* run parallel to one another. Recess 32 can be provided by way of three groove-shaped recess sections 32*a*, 32*b*, 32*c* in such a way that second to fourth wall sections 23, 25, 27 of cover cap 20 shown in FIG. 1*a* can be inserted into three groove-shaped recess sections 32*a*, 32*b*, 32*c* and in particular can be received in part in three groove-shaped recess sections 32*a*, 32*b*, 32*c*.

According to some illustrative embodiments, cover cap 20 shown in FIGS. 1*a* and 1*b* can be mounted on the coil body shown in FIGS. 2*a* to 2*c* to the extent that the cover cap is inserted into the recess. Cover cap 20 is then arranged on side HS of coil body 30 between an opening in magnetic core receptacle 31 of coil body 30 and at least one contact element 50.

With reference to FIGS. 2*a* to 2*c*, at least one contact element 50 can be configured as a gull wing contact pin and attached to contact strip 33. Correspondingly, at least one contact element 52 can also be configured as a gull wing contact pin and attached to contact strip 35. Coil body 30 can then be configured for SMD population of a printed circuit board (not shown in the figures). For example, coil body 30 is suitable for applications relating to a chopper transformer.

According to the illustration in FIG. 2*c*, coil body 30 can have a labyrinth structure L on its underside. Labyrinth structure L is provided on contact strip 33 and is formed by web sections L1, L2, L3, L4 and groove sections N1, N2, N3 formed on the underside of contact strip 33. One of groove sections N1, N2, N3 is formed between each two adjacent web sections of web sections L1, L2, L3, L4, so that two adjacent web sections are each spaced from one another by a respective groove section. Groove sections N1, N2, N3 can there be provided to feed a wire section of a winding provided above the coil body (not shown in FIGS. 2*a* to 2*c*) to at least one contact element 50. In the case of more than one contact element, wire sections which are each fed to the contact elements can then be separated from one another by web sections L1 and L3. A respective labyrinth structure can also be provided on the underside of contact strip 35.

An offset of at least one contact element 50 relative to grooves N1 to N3 is shown with further reference to FIG. 2*c* and the at least one contact element is formed in one of web sections L1 to L4.

Figure 3:
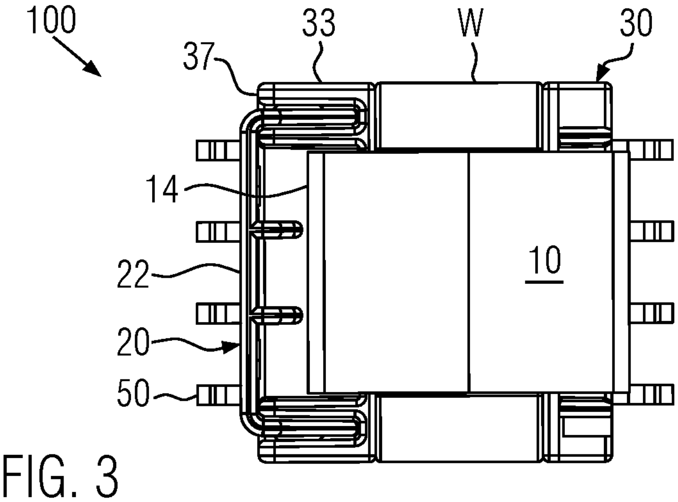

An inductive component 100 according to embodiments of the present disclosure is described hereafter with reference to the plan view shown in FIG. 3 in accordance with the first and second aspects of the disclosure. Inductive component 100 comprises cover cap 20, which is described above with reference to FIGS. 1*a* and 1*b*, and coil body 30, which is described above with reference to FIGS. 2*a* to 2*c*.

According to the illustration in FIG. 3, inductive component 100 further comprises a magnetic core 10 and at least one winding W which is provided above coil body 30. In some illustrative embodiments, magnetic core 10 of inductive component 100 can be configured as a modular magnetic core. For example, magnetic core 10 can be a U-core, double-U-core, or U-I-core which is received in part in magnetic core receptacle 31 (FIGS. 2*a* and 2*b*) of coil body 30. Alternatively, magnetic core 10 can be only an I-core which is inserted into magnetic core receptacle 31 of the coil body. According to another alternative, not shown, an E-core or a double-E-core can be provided, where the coil body can be respectively configured to receive the central leg and be formed with support surfaces for the side legs.

As described above with reference to FIGS. 2*a* to 2*c*, coil body 30 comprises at least one contact element 50 which is attached to side HS of coil body 30. The at least one contact element is provided for electrical connection to at least one winding W.

As described above with reference to FIGS. 1*a* and 1*b*, cover cap 20 is formed from electrically insulating material. Cover cap 20 is attached to coil body 30 by being pushed thereonto, wherein second wall section 23 is inserted into the recess. Cover cap 20 covers a side surface 14 of magnetic core 10 received in coil body 30 with respect to at least one contact element 50 on side HS of coil body 30. In particular, cover cap 20 is arranged between side surface 14 of magnetic core 10 and at least one contact element 50 on the coil body. Furthermore, magnetic core 10 on side HS of coil body 30 can be shielded with respect to at least one contact element 50 by third and fourth wall sections 25, 27 of cover cap 20. In some illustrative embodiments, third and fourth wall sections 25, 27 of cover cap 20 can be received in part in recess 32, as described above in view of FIG. 2*a*.

As shown in FIG. 3, side surface 14 of magnetic core 10, which faces side HS of coil body 30 and thereby contact strip 33 with at least one contact element 50, is covered at least in part by first wall section 22 of cover cap 20.

As described above with regard to FIGS. 2*a* to 2*c*, in some illustrative embodiments of the disclosure, side HS of coil body 30 can represent a high-voltage side of inductive component 100 and side NS of coil body 30 can represent a low-voltage side of inductive component 100. A distinction between the low-voltage side on side NS of coil body 30 and the high-voltage side on side HS of coil body 30 can be made in that cover cap 20 is arranged on side HS of coil body 30 in inductive component 100, and side surface 14 of magnetic core 10, i.e. the side of magnetic core 10 facing side HS of the coil body, is covered by cover cap 20 with respect to at least one contact element 50 on contact strip 33 of side HS of coil body 30.

According to illustrative examples, at least one contact element 50 can extend away from coil body 30 with respect to wall section 24 22 in a direction perpendicular thereto.

With reference to FIGS. 1*a*, 2*a* and 3, cover cap 2 comprises an air gap S which separates web sections 24 and 26 from second wall section 23, as described above with regard to FIG. 1*a*. The air gap is formed sufficiently large so that cover cap 20 can be pushed onto coil body 30 independently of web sections 24 and 26 by inserting second wall section 23 into recess 32 until first wall section 22 abuts below web sections 24, 26 against contact strip 33. A distance between first wall section 22 and side surface 14 of magnetic core 10 can then be set by way of web sections 24 and 26.

Inductive component 100 shown in FIG. 3 can be produced by a method that comprises winding coil body 30 with at least one winding W, receiving magnetic core 10 in coil body 30, and attaching cover cap 20 to magnetic core 10. Magnetic core 10 is there received in part in magnetic core receptacle 32 31 of coil body 30. Coil body 30 can there be wound independently of magnetic core 10 and magnetic core 10 be fitted to coil body 30, for example, temporally separately, or at the same time. Magnetic core 10 can also be received in coil body 20 30, for example, in that individual core segments are received in coil body 30 in the case of a modular magnetic core 10. This makes it possible to provide an automated manufacturing method for the production of inductive component 100. A position of magnetic core 10 on coil body 30 can be set by way of cover cap 20, where cover cap 20 can be attached to coil body 30 before, during, or after attachment of coil body 30 has been fitted with magnetic core 10.

Inductive component 100 described above is disclosed in some illustrative embodiments of the disclosure with reference to FIG. 3, where at least one contact element 50 on coil body 30 can be configured as a gull wing contact pin However, this is no restriction, and other contact pins can be provided.

Inductive component 100 described above is disclosed in some illustrative embodiments of the disclosure with reference to FIG. 3, where at least one contact element 50 can be arranged on a high-voltage side of coil body 30. This is no restriction of the present disclosure and, additionally or alternatively, at least one contact pin can be arranged on a low-voltage side of coil body 30.

Inductive component 100 described above is disclosed in some illustrative embodiments of the disclosure with reference to FIG. 3, where coil body 30 can be configured for SMD population of a printed circuit board (not shown). This is no restriction and inductive component 100 can be alternatively configured for THT population.

With reference to the figures, two web sections 24, 26 are shown on cover cap 20. This is no restriction an only one web section or more than two web sections can be alternatively provided on the cover cap.

It is described with reference to the figures that cover cap 20 can be pushed onto contact strip 33 on side HS of coil body 30 through recess 32. This is no restriction of the present disclosure and a recess corresponding to recess 32 can alternatively also be formed on side NS of the coil body, so that cover cap 20 can additionally or alternatively be pushed onto coil body 30 also on side NS.

Cover cap 20 is described with reference to the figures such that it is formed by four wall sections. This is no restriction of the disclosure and a cover cap can be formed only by first and second wall sections 22 and 23 or by a total of five wall sections, where a fifth wall section is provided in addition to first to fourth wall sections 22, 23, 25, 27 described and is arranged opposite the second wall section on first wall section 22 and extends parallel to second wall section 23.

Some specific exemplary embodiments with inductive component 100 shown in FIG. 3 are described with reference to FIGS. 1 to 3. Inductive component 100 there comprises illustrated magnetic core 10, at least one illustrated winding W, and illustrated coil body 30 which is wound with at least one winding W. Coil body 30 comprises at least one illustrated contact element 50 which is attached to illustrated contact strip 33 of coil body 30 for electrical connection to at least one winding W, illustrated magnetic core receptacle 31 in which magnetic core 10 is received in part, and illustrated recess 32 below magnetic core 10. Inductive component 100 further comprises illustrated cover cap 20 which is formed from electrically insulating material and is attached to contact strip 33. Cover cap 20 covers at least in part side surface 14 of magnetic core 10 facing at least one contact element 50 with respect to at least one contact element 50. Cover cap 20 comprises first wall section 22 with which cover cap 20 covers at least in part side surface 14 of magnetic core 10 facing at least one contact element 50 with respect to at least one contact element 50, and second wall section 23 which extends perpendicular to side surface 14 of magnetic core 10 and which is inserted into recess 32. First wall section 22 of cover cap 20 comprises at least one illustrated web section 24 which extends along a direction that is perpendicular to side surface 14 of magnetic core 10 towards magnetic core 10 and away from first wall section 22. At least one web section 24 is there spaced from second wall section 22 by an air gap S.

In other specific exemplary embodiments, in addition or as an alternative to the above embodiments, inductive component 100 illustrated in FIGS. 1 to 3 comprises illustrated magnetic core 10, illustrated at least one winding W, and illustrated coil body 30 which is wound with at least one winding W. Coil body 30 comprises illustrated at least one contact element 50 which is attached to illustrated contact strip 33 of coil body 30 for electrical connection to at least one winding W, and illustrated magnetic core receptacle 31 in which magnetic core 10 is received in part. Inductive component 100 further comprises illustrated cover cap 20 which is formed from electrically insulating material and which covers at least in part illustrated side surface 14 of magnetic core 10, which is aligned with at least one contact element 50, with illustrated first wall section 22 of cover cap 20 with respect to at least one contact element 50. First wall section 22 of cover cap 20 comprises at least one illustrated web section 24 which extends along a direction that is perpendicular to side surface 14 of magnetic core 10 towards magnetic core 10 and away from first wall section 22. According to these specific exemplary embodiments, coil body 30 is configured for SMD assembly or for THD assembly on a printed circuit board. This means that at least one contact element 50 is configured respectively as a THT contact element or an SMT contact element. In other words, at least one contact element 50 is configured as a push-through contact pin or as a gull wing contact.

In summary, within the scope of the disclosure, a labyrinthine air gap and creepage distance extension is proposed, for example, in U-core, double-U-core, I-core, and U-I-core applications. According to illustrative embodiments, this is achieved by a combination of a cover cap and a coil body which is configured on a contact strip of the coil body as a counterpart to the cover cap, for example, the coil body on a contact strip is formed in part as a negative shape of the associated cover cap. If the cover cap, which is configured to be closed on the back of the core, is placed in the intended negative shape as a counterpart, then the air gap and creepage distance from the at least one contact element associated with the contact strip to the magnetic core sealed off by the cover cap increases. This principle can also be applied to both sides. In illustrative examples, the cover cap is formed with web sections on the inner side. They can be used as spacers and can prevent the magnetic core in the inductive component from slipping back in the direction of the rear wall of the cover cap. By way of this measure, which defines the position of the magnetic core on the coil body, the air gaps and creepage distances can additionally be extended according to the length of the web sections.

One effect of the object of the present disclosure is that the size of inductive components cannot be increased and preferably can be reduced while simultaneously maintaining the required safety distances for basic insulation or reinforced insulation according to EN 61558-2-16+A1. The safety distances to the chassis are also observed.

Although some embodiments are described with regard to an application of SMD components, this is no restriction, and embodiments of the disclosure can also be used in connection with THT applications by designing the contact elements on the contact strips of the coil body as contact pins for THT assembly.

What is claimed is:

1. Inductive component comprising:

a magnetic core, at least one winding, a coil body wound with said at least one winding, comprising at least one contact element attached to a contact strip of said coil body for electrical connection to said at least one winding, a magnetic core receptacle in which said magnetic core is received in part, and an elongated recess which is formed in said contact strip and extends below said magnetic core received in said magnetic core receptacle and above said at least one contact element and extends in a longitudinal direction of said contact strip only in part along said contact strip, and a cover cap formed from electrically insulating material which is attached to said contact strip and covers at least in part a side surface of said magnetic core facing said at least one contact element with respect to said at least one contact element, wherein said cover cap comprises a first wall section by which said cover cap covers at least in part said side surface of said magnetic core facing said at least one contact element with respect to said at least at least one contact element, and comprises a second wall section attached along a side edge of said first wall section which extends perpendicular to said side surface of said magnetic core and which is inserted into said recess formed in said coil body, and wherein said second wall section extends between said magnetic core and said at least one contact element in said coil body.

2. Inductive component according to claim 1, wherein said cover cap furthermore comprises a third wall section and a fourth wall section which are oriented perpendicular to said first and second wall sections, and wherein said third wall section and said fourth wall section extend parallel to one another and each along an edge of said first wall section.

3. Inductive component according to claim 2, wherein said recess in said coil body is formed from three groove-shaped recess sections, each of which is formed to receive in part said second to fourth wall sections.

4. Inductive component according to claim 1, wherein said first wall section of said cover cap comprises at least one web section which extends along a direction that is perpendicular to said side surface of said magnetic core towards said magnetic core and away from said first wall section.

5. Inductive component according to claim 4, where said at least one web section is spaced from said second wall section by an air gap.

6. Inductive component according to claim 4, wherein more than one web section is formed as a plurality of web sections on said first wall section.

7. Inductive component according to claim 1, wherein said cover cap is pushed onto said coil body so that said magnetic core is surrounded at least in part by said cover cap on at least three side surfaces.

8. Inductive component according to claim 1, wherein said at least one contact element is configured as a gull wing contact pin and said inductive component is provided as an SMD component.

9. Inductive component according to claim 1, wherein said at least one contact element is configured as a THD contact pin and said inductive component is provided as an THD component.

10. Inductive component according to one of the claim 1, wherein said cover cap is arranged only on a high-voltage side of said coil body.

11. Inductive component comprising:

a magnetic core, at least one winding, a coil body wound with said at least one winding, comprising at least one contact element attached to a contact strip of said coil body for electrical connection to said at least one winding, and a magnetic core receptacle in which said magnetic core is received in part, and a cover cap formed from electrically insulating material which covers at least in part a side surface of said magnetic core facing said at least one contact element by a first wall section of said cover cap with respect to said at least one contact, wherein said first wall section of said cover cap comprises at least one web section which extends along a direction that is perpendicular to said side surface of said magnetic core towards said magnetic core and away from said first wall section and is in physical in contact with said magnetic core.

12. Inductive component according to claim 11, wherein said coil body comprises an elongate recess formed in said contact strip and extending below said magnetic core received in said magnetic core receptacle and above said at least one contact element and extending only in part in a longitudinal direction of said contact strip along said contact strip, wherein a second wall section of said cover cap extending perpendicular to said side surface of said magnetic core is inserted into said recess.

13. Inductive component according to claim 12, wherein said at least one web section is spaced from said second wall section by an air gap.

14. Inductive component according to claim 12, wherein said cover cap furthermore comprises a third wall section and a fourth wall section which are oriented perpendicular to said first and second wall section, and wherein said third wall section and said fourth wall section extend parallel to said at least one web section and each along an edge of said first wall section.

15. Inductive component according to claim 12, wherein said recess is formed from three groove-shaped recess sections, each of which is formed to receive in part said second to fourth wall sections.

16. Inductive component according to claim 11, wherein more than one web section is formed as a plurality of web sections on said first wall section.

17. Inductive component according to claim 11, wherein said cover cap is pushed onto said coil body so that said magnetic core is surrounded at least in part by said cover cap on at least three side surfaces.

18. Inductive component according to claim 11, wherein said at least one contact element is configured as a gull wing contact pin and said inductive component is provided as an SMD component.

19. Inductive component according to claim 11, wherein said at least one contact element is configured as a THD contact pin and said inductive component is provided as an THD component.

20. Inductive component according to claim 11, wherein said cover cap is arranged only on a high-voltage side of said coil body.

* * * * *